United States Patent [19]

Pelle et al.

[11] Patent Number: 4,867,880
[45] Date of Patent: Sep. 19, 1989

[54] BREWING DEVICE

[75] Inventors: Theos R. Pelle; Bobby H. Allen, both of Louisville, Ky.

[73] Assignee: D.J. Incorporated, Fairdale, Ky.

[21] Appl. No.: 257,878

[22] Filed: Oct. 14, 1988

[51] Int. Cl.$^4$ .............................................. B01D 23/28
[52] U.S. Cl. ...................... 210/474; 210/477; 210/479; 210/482; 99/295; 426/77; 426/81
[58] Field of Search ................. 426/77, 81; 99/295; 210/473, 474, 477, 478, 479, 480, 481, 482

[56] References Cited

U.S. PATENT DOCUMENTS

| | | | |
|---|---|---|---|
| 638,698 | 12/1899 | Bourie | 210/473 |
| 1,175,282 | 3/1916 | Maine | 210/473 |
| 1,612,450 | 12/1926 | Leichtfuss | 210/474 |
| 3,166,003 | 1/1965 | Merson | 210/474 |
| 3,971,305 | 7/1976 | Daswick | 210/474 |
| 4,417,504 | 11/1983 | Yamamata | 210/474 |

Primary Examiner—Richard V. Fisher
Assistant Examiner—Wanda L. Millard
Attorney, Agent, or Firm—Edward M. Steutermann

[57] ABSTRACT

A device for brewing a beverage into container, such as a cup, which includes an enclosure adapted to fit over the rim of a receiver such as a cup with a space between the bottom of the device and the receiver and where a reservoir is provided to receive granular or particulate material to be used in the brewing process. A removeable water apertured distributor plate is provided to be located above the reservoir with foot members provided to generally center the apertured plate and to provide an annular space around a part of the plate between the edge of the plate and the chamber defined by the enclosure. A filter is provided in the bottom of the reservoir to prevent loss of the particulate material which is being extracted into the receptical.

2 Claims, 1 Drawing Sheet

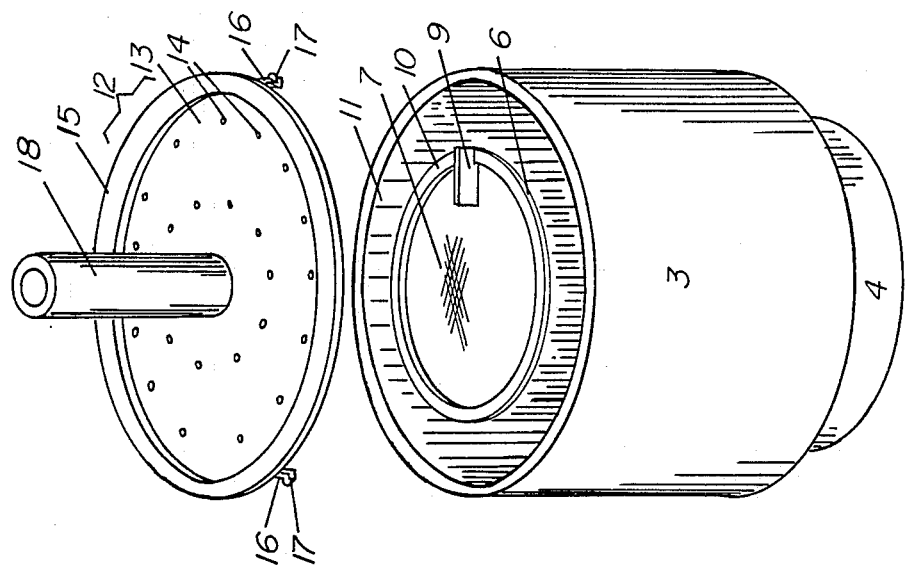
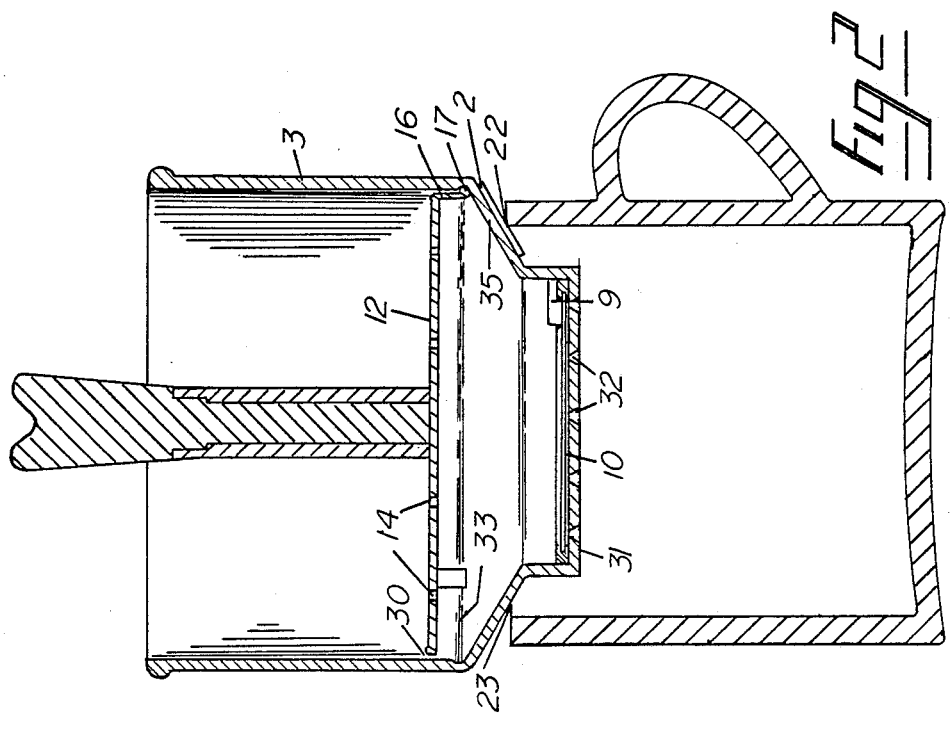
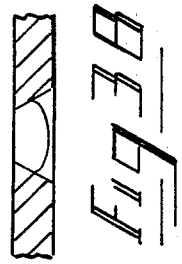

BREWING DEVICE

FIELD OF THE INVENTION

The present invention is directed to processes for extraction of essence from particulate materials such as coffee; and is particularly adapted to devices for the extraction processes involving such materials utilising water which has been heated in a microwave heating device.

BACKGROUND OF THE INVENTION

Most home coffee making methods utilizing percolator process or drip process to extract coffee from coffee grounds. In the case of the percolator the water flows upwardly through a stand pipe and over the bed of ground coffee where the process lasts for selected, usually short, period of time. The boiling water is forced upwardly through the standpipe and flows quickly through the bed of coursely ground coffee which is particularly inefficient method in that a large quantity of the coffee essence remains after the percolation process is completed.

Also water used in the percolation process at the boiling temerature and is warmer than required. Secondly the coffee is brewed is recycled through the bed of coffee grounds which decreases the effeciency of the extraction process and the excessive heating of the brewed coffee diminishes the favorable characteristics of the brew. Additionally, in most percolation processes the finer grinds of the coarse coffee in end up in the final product further detracting from the desirability of the product.

In drip grind arrangements a finer ground coffee is utilized and a paper filter is provided where the coffee flows one time through the bed of coffee. Because of the procedure utilized in many instances the temperature of the water used in the extraction process can be lower than 212° F.; therefore a better brew is obtain. Additionally, coffee is not recycled through the bed and the quality is better. Additionally, the finer grounds are retained within the paper filter so that the product is of a better quality.

Even in the case of drip process coffee making the efficient provision of a one cup yield is difficult to obtain.

Several procedures have been developed to provide one cup, or low yield for preparation of one cup of coffee at a time. U.S. Pat. No. 1,546,434 teaches a receptacle with a plate and foraminous disc which allows coffee to be poured in from the top and pulled by gravity through the coffee and the disc into the cup below. U.S. Pat. No. 1,456,010 discloses a one cup coffee maker including a plate which acts as a water spreader to distribute water over the area of the bed of coffee and to hold the coffee with sufficient tightness in the chamber to prevent particles from floating and moving about as the water is percolating through the flat paper. U.S. Pat. No. 2,732,878 teaches a coffee maker with a cylindrical type brewing chamber to receive a bag of coffee which allows the coffed to be emitted therefrom by gravity flow. Additionally, U.S. Pat. No. 3,215,060 discloses a coffee maker where a second piece is removed from the first portion for disposal of the coffee and washing. U.S. Pat. No. 3,695,479 teaches use of a metal wire mesh having 25 micron aperatures used with coffee inlets slots to control flow of coffee through a coffee maker. U.S. Pat. No. 1,889,543 teaches a coffee maker using a porous disc where hot water is poured into the top of the device and flows through the bed of coffee received on the disc.

British patent No. 338,126 teaches another arrangement utilizing a porous disc as German patent No. 390,351 and 1,122,057. U.S. Pat. No. 1,122,057, 1,113,920, and U.S. Pat. No. 1,965,750 teache other arrangements utilizing a ? disc and hold down device. U.S. Pat. No. 1,885,666 teaches an arrangement utilizing another disc arrangement. U.S. Pat. No. 1,666,470 and 3,354,812 teach other arrangements.

None of the foregoing prior art reference teaches or even remotely suggest an arrangement as provided in the subject invention much less an arrangement which is particularly useful in connection with the brewing of coffee utilizing water heated in a microwave device.

SUMMARY OF THE INVENTION

The present invention provides a new and useful arrangement for extraction of the essence of particulate materials such as coffee, in a brewing process. Particularly, devices within the scope of the present invention are useful in connection with brewing such beverages utilizing water heated in a microwave device.

It has been unexpectedly found that water brewed in a microwave device apparently becomes super heated, perhaps because of the lack of mucleating sites in the heating process; and when poured over a bed of particulate matter for the purpose of extracting essences from the particulate matter the water boils violently and can cause injury and damage to the user not to mention overflowing the particulate matter out of the reservoir.

Accordingly, devices within the scope of the present invention are adapted to accommodate the natural release of energy with accompanies the exposure of such water to the device.

Additionally, devices within the scope of the present invention can also be used successfully with water heated by other means.

Additionally, devices within the scope of the present invention provide means to accommodate the brewing process in a rapid and efficient matter to preserve the flavor of the extracted essences and provide a superior beverage.

More particularly, the present invention provides a device for brewing a beverage into container, such as a cup, which includes an enclosure adapted to fit over the rim of a receiver such as a cup with a space between the bottom of the device and the receiver and where a reservoir is provided to receive granula or particulate material to be used in the brewing process. A removeable water apertured distributor plate is provided to be located above the reservoir with foot members provided to generally center the aperatured plate and to provide an annular space around a part of the plate between the edge of the plate and the chamber defined by the enclosure.

A filter is provided in the bottom of the reservoir to prevent loss of the particulate material which is being extracted into the receptical.

While various arrangements within the scope of the present invention will occur to those skilled in the art upon reading the disclosure set forth hereinafter, examples within the scope of the present invention are illustrated in the accompanying drawings and described hereinafter where it will be understood that such illustrations and descriptions are by way of example only and not by way of limitations.

BRIEF DESCRIPTIONS OF THE DRAWINGS

In the arrangement in the accompanying drawings:

FIG. 1 is a exploded perspective view of an arrangement within the scope of the present invention;

FIG. 2 is a cross sectional view of an arrangement within the scope of the present invention;

FIG. 3A and 3B is view taken along a line passing through line 3—3 of FIG. 2 illustrating one feature of the present invention.

DETAILED DESCRIPTION OF THE DRAWINGS

FIG. 1 is an illustration of an example of a device within the scope of the present invention illustrating a generally cylindrical chamber 3 having a reservoir chamber 4 located at the bottom thereof. A filter is provided having a ring 6 with a mesh surface 7, for example a screen, which can be either metallic or other of materials such as plaster. A lift 9 is to facilitate removal of the unit 6 from the device described hereinafter. A chamber 11 is defined in the receptacle 3 and adapted to receive hold down device 12 including a plate 13 having apertures 14 adapted to allow flow of water through the device. Feet 16 are provided having distal ends 17 which extend outwardly slightly from the outer periphery of the ring 12. A handle 18 is provided in the center of the device and utilized as described hereinafter.

FIG. 2 is an illustration of the arrangement of FIG. 1 in assembled condition where a cup 21 is provided and adapted to receive the receptacle 3. As shown receptacle 3 is provided with ribs 2 (only one is shown to give correct perspective to the drawing), where the ribs rest on upper edge 22 of cup 21 to define as shown, an opening 23 is provided to allow for escape of air from the cup 21 as the cup is filled with water.

The screen assembly 12 is shown located in the bottom of the reservoir 4 where the bottom wall 31 of the reservoir portion is provided with apertures 32 as described herennafter with reference to FIGS. 3A, and 3B. The ring 6 of the filter assembly 10 is, as shown located on the bottom 31 of the reservoir section 4. The reservoir section as shown has a smaller diameter than the diameter of the receptacle 3 conical sides 33 are provided to connect the reservoir section 4 with the receptacle section 3.

As further shown a small groove 33 can be provided around the bottom edge of the wall receptacle 3 at the inner section of the conical surface 33 to receive the detents 17 of the feet 16. In this manner an air flow area 36 is provided between the outer edge of the ring 15 of the hold down assembly 12 and the inner surface of the wall 3.

The handle assembly 18 is provided and is adapted to receive a post 19 which can be decorative in nature and extend above the top of receptacle 3 to facilitate the removeal of the hold down assembly 12 from the unit as also shown the apertures 14 are provided to allow flow of water through the hold down plate 12 and into the reservoir 4 which is adapted to receive the particulate material to be used in the brewing process.

As previously stated one feature of the present invention is defining that the use of water which has been heated in a microwave device in prior art arrangements leads to excessive boiling and overflow of the water and the particulate material from the container such as receptacle 3.

It has been found that by the combination of features presented and described herein this occurrence can be eliminated.

In operation, coffee placed into the filter assembly 10 as located in the bottom of reservoir 4 as shown and a charge of coffee is placed on top of the filter arrangement. The hold down assembly plate 12 is than located within receptacle 3 with the detents 17 of the legs 16 located in the groove 33 to fixedly position the device within the receptacle. Heated water is then poured on top of the plate 12 and flows through the apertures 14 into the coffee located in the receptacle 4. The initial bubble nucleation commences but the overflow is restrained by the hold down plate 12 yet any excess air or steam which is generated is allowed to escape through the annular area 36 provided around the porion of the outer edge of the hold down plate 12 thus preventing the escape of the material used in the brewing process and yet preventing the overflow of the gas, steam and particulate material form the receptacle.

While the devices has been described in terms of water heated in a microwave devices within the scope of the present invention have been also found to operated satisfactorily with water heated by other more conventional means.

One further feature of the device is illustrated in FIGS. 3A, and 3B which are a cross section along a plane taken through line 3—3 of FIG. 2 and illustrate the angular disposition of the edges of the apertures 32. As shown input is formed within the opening 38 of the aperture 35 which is an inverted frustro conical shape. The droplett formation begins at the top surface of the plate 31 and due to surface tension does not break away from the plate until the downward vertical force acting on the droplett are equal to the upward vertcal surface tension forces. The effect of capilarity characterized by a meniscus contact angle will cause the droplett contact ring to move into the conical opening 32 until the contact meniscus angle approaches a specific angle determined by the meniscusity of the material flowing. As a result the verticle component of the surface tension forces is reduced by the total force across the diameter of the droplett is increased in FIG. B until the downward gravitational forces equal or exceed the verticle surface tension it forces thus, causing the droplett to break loose and fall into the cup. Thus, by utilization of an inverted conical opening rather than uniform diameter cylindrical openings as shown in the prior art, and a plate of sufficient thickness the effect of the sloping tapered walls can fully utilized.

It will be understood that the foregoing is but one example of an arrangement within the scope of the present invention and that various other arrangements also within the scope of the present invention will occur to those skilled in the art upon reading the disclosure set forth herinbefore.

The claims of the invention are:

1. A device for brewing a beverage into receiver means having a bottom with upwardly extending wall means terminating at a rim defining a receiver opening to said receiver means; brewing shell means having a frusto conical mid section a longitudinal axis and having a base with a mean diameter greater than the diameter of said receiver opening, and outlet with mean diameter smaller then said receiver opening to be received within said receiver means and where the outer surface of said frusto conical mid section includes outwardly extending spacer means along a portion of the length thereof where said spacer means are received on said rim of said receiver means to define annular space between the frusto conical mid section and the receiver, means first wall means extending generally downwardly from the outlet of said frusto conical mid section defining a second opening; first perforated plate means extending across said second opening to define an extractant reservoir to receive particulate material to be used in a brewing process; second wall means extending upwardly from said base of said frusto conical mid section to define a water receptical to receive water, groove means extending around at least a portion of a defined joint between the base of the frusto conical mid section and said second wall means, and second perforated plate means having foot members which extend outwardly from the second perforated plate means with outwardly extending detents to be received in said groove means to hold said second perforated plate means in generally transverse relation to the longitudinal axis of said frusto conical mid section where the diameter of the second perforated plate means is lss than the inner mean diameter of said second wall means so an annular space is defined between said second wall means and the outer diameter of the second perforated plate means.

2. A device according to claim I comprising a filter means located between said second perforated plate means said first perforated plate means to retain particulate matter which is being extracted.

* * * * *